United States Patent [19]

Albers, Sr.

[11] E Patent Number: Re. 32,728

[45] Reissued Date of Patent: Aug. 9, 1988

[54] CATTLE STANCHION APPARATUS

[76] Inventor: Teo Albers, Sr., 18007 Arline Ave., Artesia, Calif. 90701

[21] Appl. No.: 7,454

[22] Filed: Jan. 27, 1987

Related U.S. Patent Documents

Reissue of:

[64] Patent No.: 4,495,897
Issued: Jan. 29, 1985
Appl. No.: 516,384
Filed: Jul. 22, 1983

U.S. Applications:

[63] Continuation-in-part of Ser. No. 431,264, Sep. 30, 1982, Pat. No. 4,476,815.

[51] Int. Cl.[4] ..... A01K 1/06
[52] U.S. Cl. ..... 119/148
[58] Field of Search ..... 119/147 R, 147 A, 148, 119/149

[56] References Cited

U.S. PATENT DOCUMENTS

| | | | |
|---|---|---|---|
| 549,965 | 11/1895 | Howard . | |
| 1,081,045 | 12/1913 | James | 119/148 |
| 4,037,566 | 7/1977 | Albers | 119/147 |
| 4,051,813 | 10/1977 | Albers | 119/148 |
| 4,185,592 | 1/1980 | Albers, Sr. | 119/148 |
| 4,314,528 | 2/1982 | Fogleman | 119/147 R |
| 4,377,131 | 3/1983 | Vandenberg et al. | 119/148 |
| 4,476,815 | 10/1984 | Albers, Sr. | 119/147 R |

FOREIGN PATENT DOCUMENTS

| | | | |
|---|---|---|---|
| 920692 | 11/1954 | Fed. Rep. of Germany . | |
| 2911431 | 9/1980 | Fed. Rep. of Germany | 119/148 |
| 2221071 | 10/1974 | France | 119/148 |
| 2242929 | 4/1975 | France | 119/148 |
| 636215 | 4/1950 | United Kingdom . | |

*Primary Examiner*—Robert P. Swiatek
*Attorney, Agent, or Firm*—Fulwider, Patton, Rieber, Lee & Utecht

[57] ABSTRACT

Cattle stanchion apparatus in which a plurality of fixed and release stanchions define a row of head openings for animals, the release stanchions tending to pivot to open positions. Double latches at the upper extremities of the release stanchions are engageable by couplers carried by a rotatable and axially movable positioner. An operating mechanism is actuable to axially move the positioner and engage the latches of the release stanchions to move them in unison, and an associated rotating mechanism is actuable to rotate the positioner and thereby move the couplers into and out of possible engagement with the latches. The arrangement gives the operator the capability of moving all of the release stanchions to closed positions to lock the animals in the feeding stalls, or allowing the animals individually to actuate the system to lock themselves in, or allowing the animals to enter and leave the stalls as they wish. The latches are manually manipulatable to quickly and safely release downed cattle from individual feeding stalls.

21 Claims, 3 Drawing Sheets

FIG. 8
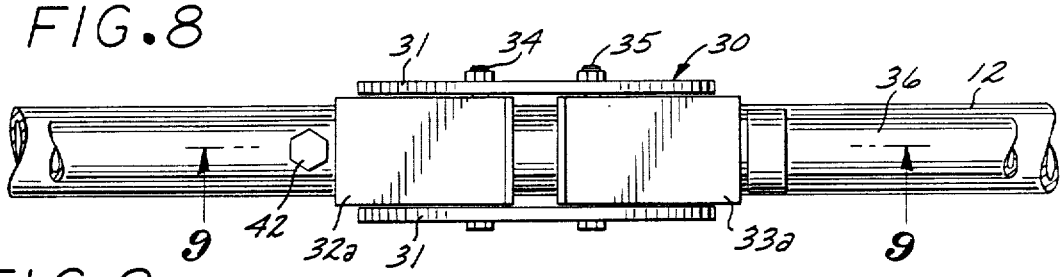
FIG. 9
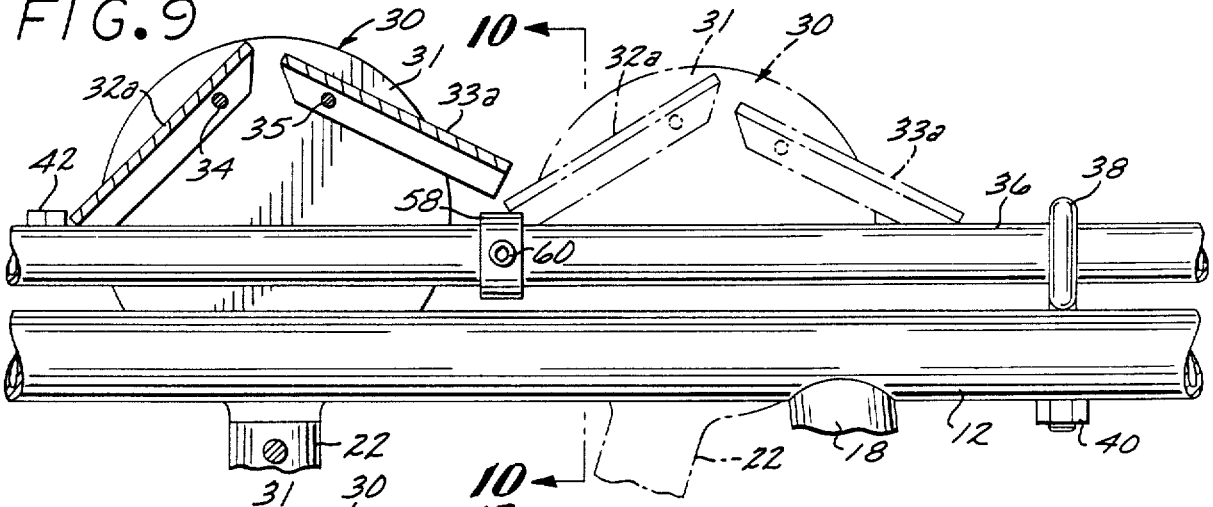
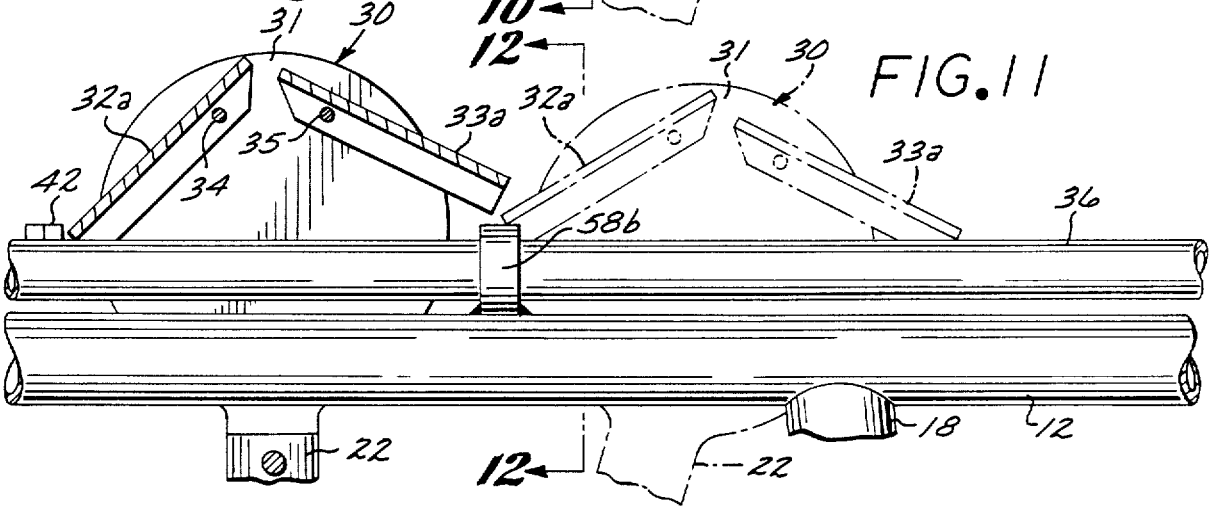
FIG. 11
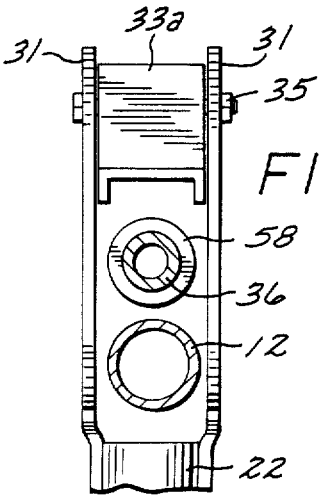
FIG. 10
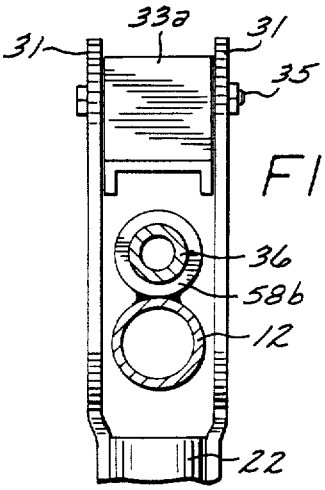
FIG. 12

CATTLE STANCHION APPARATUS

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part of applicant's [copending] application Ser. No. 431,264, filed Sept. 30, 1982, [and] entitled "Cattle Stanchion Apparatus", *issued Oct. 16, 1984 as U.S. Pat. No. 4,476,815.*

BACKGROUND OF THE INVENTION

1. Field of the Invention

The present invention relates to cattle stanchion apparatus and more particularly to cattle stanchion apparatus capable of actuation to quickly and easily release downed cattle.

2. Description of the Prior Art

Various types of cattle stanchion apparatus are disclosed in the prior art, and particularly in my U.S. Pat. No. 4,037,566, issued July 26, 1977, and entitled "Cattle Locking Apparatus"; U.S. Pat. No. 4,051,813, issued Oct. 4, 1977, and entitled "Locking Stanchion for Cattle"; U.S. Pat. No. 4,185,592, issued Jan. 29, 1980, and entitled "Cattle Stanchion Apparatus"; and my copending patent application Ser. No. 431,264, filed Sept. 30, 1982, and entitled "Cattle Stanchion Apparatus". Such prior art appartuses typically employ couplers selectively engageable with the release stanchions for opening and closing feeding stalls for the cattle. Such apparatuses are generally not capable of enabling rapid and hazard free movement of a single release stanchion to open a stall and permit a downed animal to be freed.

SUMMARY OF THE INVENTION

The present invetion provides cattle stanchion apparatus in which fixed stanchions and release stanchions define head openings for animals such as dairy cows, each release stanchion being pivotally mounted, and tending to fall or pivot to an open position in which the lower portion of the release stanchion is presented for engagement by the animal as it lowers its head to feed. The animal's head pivots the release stanchion to a closed position. Double latches on the upper portion of each release stanchion are freely pivotable relative to an elongated positioning means, provided couplers on the positioning means are located out of possible engagement by the latches.

The present apparatus includes a locking or rotating means for rotating the positioning means so that its couplers are aligned for engagement with the latches of the release stanchions or, alternatively, to place its couplers out of alignment for such engagement. When the couplers are aligned for engagement with the latches, axial movement of the positioning means by the dairyman is effective to move the release stanchions to closed positions. Alternatively, proper placement of the positioning means, with the couplers in position for engagement with the release stanchion latches, enables each release stanchion to be moved to and locked in its closed position by the animal itself.

The foregoing arrangement enables the operator to move all of the release stanchions to their locked positions, or he can manipulate the apparatus to permit the cattle to move the release stanchions to their closed positions and lock themselves in place without operator intervention, or he can permit the cattle to move the release stanchions freely between open and closed positions so that they can feed or leave as they wish.

A particular feature of the present invention is the provision of double latches and associated couplers for each release stanchion which, in addition to performing the functions just mentioned, can also be quickly and easily operated to allow movement of an individual release stanchion to enlarge the stall or head opening and permit easy removal of a cow downed in the stall.

Other objects and features of the invention will become apparent from consideration of the following description taken in connection with the accompanying drawings.

BRIEF DESCRIPTION OF THE DRAWINGS

FIG. 8 is a view similar to FIG. 4, but illustrating a second embodiment of the inventor in which the safety coupler and one of the double couplers are combined in a single element mounted to the positioner;

FIG. 9 is a view similar to FIG. 6, but illustrating the second embodiment, the full and phantom line positions illustrating movement of the release stanchion to the downed cattle release position subsequent manual raising and release of one of the latches;

FIG. 10 is a view taken along line 10—10 of FIG. 9;

FIG. 11 is a view similar to FIG. 9, but illustrating a third embodiment of the invention in which the safety coupler and one of the double couplers are combined in a single element mounted to the cattle stanchion top rail; and FIG. 12 is a view taken along line 12—12 of FIG. 11.

DESCRIPTION OF THE PREFERRED EMBODIMENT

Figure 1:
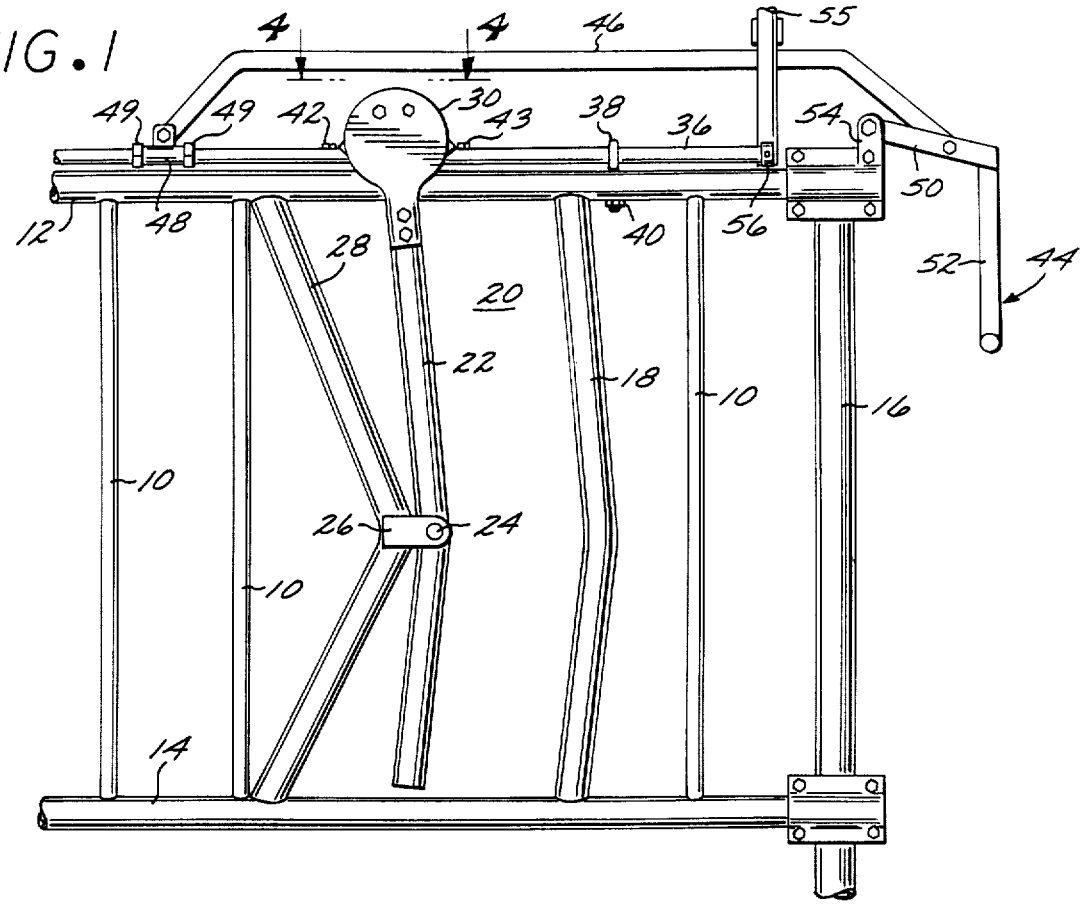
FIG. 1 is a front elevational view of one end of a cattle stanchion appparatus according to the present invention, illustrating the positioner in its retracted, locking position, with the rotating means in its upper or locked position, the double couplers in their locking positions, and the release stanchion in its closed position.

Referring now to the drawings, there is illustrated a cattle stanchion apparatus of the type in which a plurality of upright, horizontally spaced apart bars or rods 10 extend between and are welded to a tubular top rail 12 and a tubular bottom rail 14. The stanchion apparatus includes a plurality of tubular vertical end rails 16, only one of which is illustrated, which are secured to the ground or other supporting structure (not shown) at its lower end.

At horizontally spaced intervals, larger tubular fixed stanchions 18, only one of which is illustrated, are welded or otherwise rigidly secured at their upper and lower extremities to the top and bottom rails 12 and 14. Above its midportion each stanchion 18 is preferably bent or offset to the left, as seen in FIG. 1, so as to define with an adjacent elongated release stanchion 22 a head opening 20. The release stanchion 22 is similarly bent or deformed to the left above its midportion to thereby define a head opening 20 of generally uniform width from top to bottom, as seen in FIG. 1.

Although only one fixed stanchion 18 and release stanchion [20] *22* are illustrated, it will be understood that the arrangement is repeated at regular intervals along the length of the present apparatus to define as many head openings 20 as may be desired. Likewise, although the following disclosure is primarily limited to a description of the operation of the components for one head opening 20, it will be understood that a plurality of sets of such components are employed for the plurality of head openings 20, unless otherwise indicated.

Figure 2:
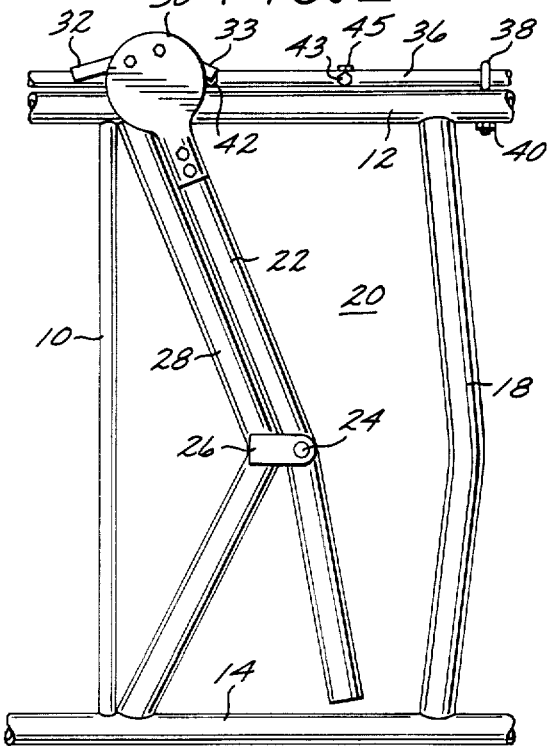
FIG. 2 is a view similar to FIG. 1, but illustrating the release stanchion in its open position and the double couplers rotated to their release positions.

Each release stanchion 22 is mounted for pivotal movement between a closed position, as illustrated in FIG. 1, and an open position, as illustrated in FIG. 2. In the embodiment illustrated, the pivotal movement is about an axis located between the oppsite extremities of the release stanchion, the axis being defined by a pivot bolt 24 carried by a bracket 26. The bracket 26 is welded to a section of relatively heavy tubing 28 which is offset at approximately its mid portion toward the head opening 20. The offset is quite severe to define a head opening 20 which, in the open position of the release stanchion 22, is relatively wide at its top and narrow in the middle. When the release stanchion 22 is in the downed cattle release position of FIG. 3, as will be seen, the configuration of the tubing 28 defines a relatively wide bottom opening.

The release stanchion 22 is preferably mounted below its midpoint so that it is heavier above the pivot bolt 24. It will therefore pivot to and remain in its open position in the absence of any other constraint. Various other means may be provided to induce this tendency to pivot to an open position, as discussed in my copending patent application Ser. No. 431,264.

In the open position of the release stanchion 22, as seen in FIG. 2, the enlarged head opening 20 enables an animal easily to place its head through the opening 20 for feeding from a feed trough (not shown) located on the other side of the present apparatus.

When an animal places its head in the opening 20, and dips or lowers its head into the feed trough, the lower portion of the release stanchion 22 is engaged by the animal's neck. This causes the release stanchion to pivot from its open position toward its closed position. As will be seen, the present apparatus can be arranged to allow the release stanchion to pivot to its open position when the animal raises its head, thereby freeing the animal to leave the feeding stall without any operator intervention. The apparatus can also be arranged to lock the release stanchion in its closed position so that operator intervention is necessary in order to allow the animal to leave the feeding stall.

Figure 4:
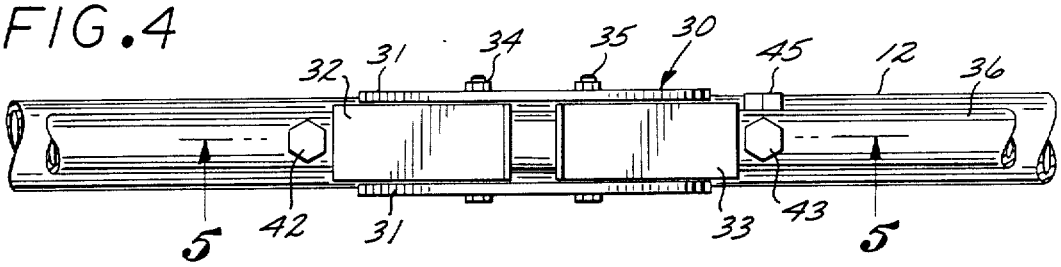
FIG. 4 is an enlarged view taken along the line 4—4 of FIG. 1.

A latching means is mounted to the upper end of each release stanchion 22, comprising a bracket 30 defined by a pair of spaced apart circular plates 31 bolted to the stanchion 22 and straddling opposite sides of the top rail 12, as best seen in FIG. 4. Sufficient clearance exists between the top rail 12 and the plates 31 to enable the bracket 30 to move generally longitudinally relative to the rail 12 during pivotal movement of the release stanchion 22.

The upper portions of the plates 31 mount a pair of pivot pins 34 and 35 which extend over the top of the top rail 12 and pivotally support the inner extremities, respectively, of a pair of elongated, channel shape latches 32 and 33.

The opposite channel legs of the free ends of the latches 32 and 33 straddle an elongated rod or positioner 36 which overlies and extends substantially parallel to the top rail 12. The positioner 36 also underlies the pivot pins 34 and 35 of all the release stanchions 22. The positioner 36 is rotatably and axially supported at intervals along its length by loops or eyes 38 (only one of which is illustrated) encircling the positioner 36. A threaded shank of each eye 28 extends through the top rail 12 and is held in position by a nut 40.

The positioner 36 is axially slideably movable through the eyes 38 between the retracted position of FIG. 1 and an extended position in which the positioner 36 is located to the left of the position of FIG. 1, as will be described.

The smooth cylindrical exterior of the rod or positioner 36 does not constrain the free or unpivoted ends of the latches 32 and 33 from sliding back and forth over the positioner 36 during pivotal movement of the release stanchion 22 between its open and closed positions. However, for each head opening 20 a pair of bolts are fixed within suitable longitudinally spaced apart openings in the positioner 36 so that their projecting heads define a double coupler comprising couplers 42 and 43. These are engageable by the free or unpivoted extremities of the latches 32 and 33, depending upon the rotated and axial locations of the positioner 36.

In operation the latches 32 and 33 fall of their own weight or, if desired, are urged downwardly by suitable springs (not shown), so that their free edges are urged onto the couplers 42 and 43. This affects the freedom of the release stanchion 22 to pivot, depending upon the direction of movement of the latches relative to the couplers, as will be seen.

A third bolt is disposed through a suitable opening in the positioner 36 transversely of the axes of the bolts for the double couplers 42 and 43. The projecting head of this third bolt defines a safety coupler 45. It is engageable by the free end of the latch 33 in certain rotated positions of the positioner 36, as will be seen.

As best seen in FIG. 1, axial movement of the positioner 36 is effected by an operator assembly 44. This assembly is described in detail in my [copending application Ser. No. 431,264,] *U.S. Pat. No. 4,476,815;* and reference is made to that [application] *patent* for a fuller disclosure of its operation. However, in general, the assembly 44 comprises an elongated bar 46 pivotally connected at its left extremity to a cylindrical sleeve 48. The sleeve 48 is rotatably carried by the positioner 36 and is axially fixed in position by a pair of collars 49. The collars 49 are fixed to the positioner 36 by usual set screws (not shown) extending through the sleeve 48 and bearing against the outer surface of the positioner 36.

The opposite or handle end of the bar 46 is pivotally connected between a pair of elongated links 50, only one of which is shown, which are each integrally secured at one end to a handle 52. The other end of each of the links 50 is pivotally secured to an upstanding pair of straps 54, only one of which is shown, fixed to the upper rail 12. Upward movement of the handle 52 from the position illustrated in FIG. 1 axially moves the positioner 36 to the left from the retracted position of FIG. 1 to an extended position (not shown).

The positioner 36 is rotatable about its axis by a locking or rotating means to move the couplers 42 and 43 into and out of their uppermost positions, and thus in and out of the path of engagement with the latches 32 and 33. This rotating means is more particularly described in my [copending application Ser. No. 431,264] *U.S. Pat. No. 4,476,815*. In general, the rotating means comprises an elongated handle [54] *55* that can be raised and lowered to rotate the positioner 36 through approximately a 90° angle. The handle [54] *55* is welded at its inner end to an annular collar 56 fixed to the positioner 36 by a usual set screw (not shown).

In operation, if the release stanchion 22 is locked in the closed position of FIG. 1, the dairyman can move all of the release stanchions 22 to their open positions by raising the handle 52. Each coupler 43 will engage the adjacent latch 33 and move the associated release stanchion 22 open. At this point the free end of each latch 33 is engaged by a coupler 43 so that no animal can pivot the release stanchion 22 open. It is to be noted also that in this position of the components, particularly because of the engagement of the free ends of the latches 32 by the couplers 42, a dairyman could simply lower the handle 52 to carry all of the release stanchions 22 to the right simultaneously to lock in cattle in feeding positions, or lock out cattle not then feeding, as he wishes.

Assuming the release stanchions 22 have just been moved to their open positions by the dairyman, he can lower the handle 52 to move the positioner 36 to the right without also moving the release stanchion 22 to their open positions by first rotating the handle [54] *55* to position the couplers 42 and 43 to the side and out of the path of the latches 32 and 33. At this point the coupler 45 will be upwardly disposed in the path of engagement with latch 33. This position of the components is illustrated in FIG. 2.

As seen in FIG. 2, the weight of each release stanchion 22 will maintain it in the open position illustrated, but cows can move the stanchions and freely enter and leave the feeding stalls as they like. This is because the couplers 42 and 43 are horizontally disposed and out of the path of the latches 32 and 33, and the release stanchions 22 can swing freely between their open and closed positions as cattle enter and withdraw from the head openings 20.

Figure 3:
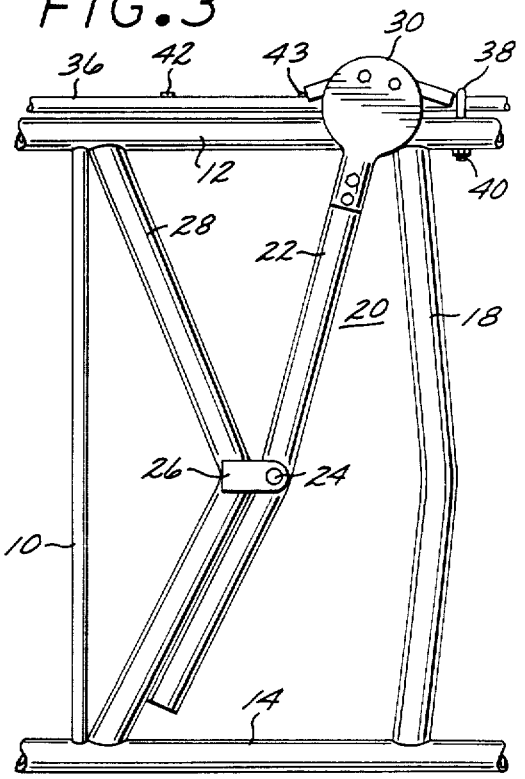
FIG. 3 is a view similar to FIG. 2, but illustrating the double couplers rotated to their locking positions and the release stanchion in its downed cattle release position.

However, with the safety coupler 45 upwardly located, the release stanchion 22 is prevented from pivoting beyond the closed position of FIG. 1 to the position of FIG. 3. If the release stanchion 22 were permitted to freely pivot to the position of FIG. 3 during cattle feeding, with one cow's head in the lower part of the head opening 20, another cow could and often would insert its head in the upper space defined between the tubing 28 and the release stanchion 22. This would present a potential danger to one or both cows and would at the least require the immediate attention of a dairyman who could otherwise be employed in some more productive task.

If the dairyman wants the cows to lock themselves in once they enter the feeding stalls, and again assuming that each release stanchion 22 has fallen open of its own weight to the position of FIG. 2, he moves the handle 55 to locate the positioner 36 in the rotated position of FIG. 1. This locates the safety coupler 45 horizontally disposed and out of the way, and locates the double couplers 42 and 43 in their uppermost, vertically disposed positions in the path of engagement with the latches 32 and 33. In this position the latch 33 rests on and is adapted to slidably pass to the right of the coupler 42.

Figure 5:
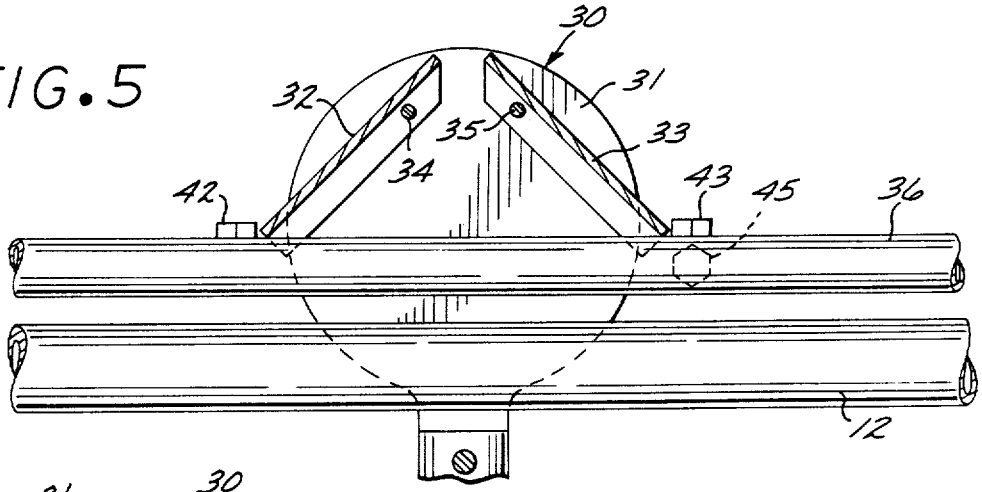
FIG. 5 is a view taken along the line 5—5 of FIG. 4.

As a cow dips its head downwardly in the head opening 20 and engages the release stanchion 22, it pivots the stanchion to the position of FIG. 1. The latches 32 and 33 ride into positions between the couplers 42 and 43, as seen in FIGS. 1, 4 and 5. This prevents pivotal movement of the release stanchion 22 from this closed position in either direction, either to an open position or to the cattle down release position of FIG. 3. The cow thus has locked itself in.

Figure 7:
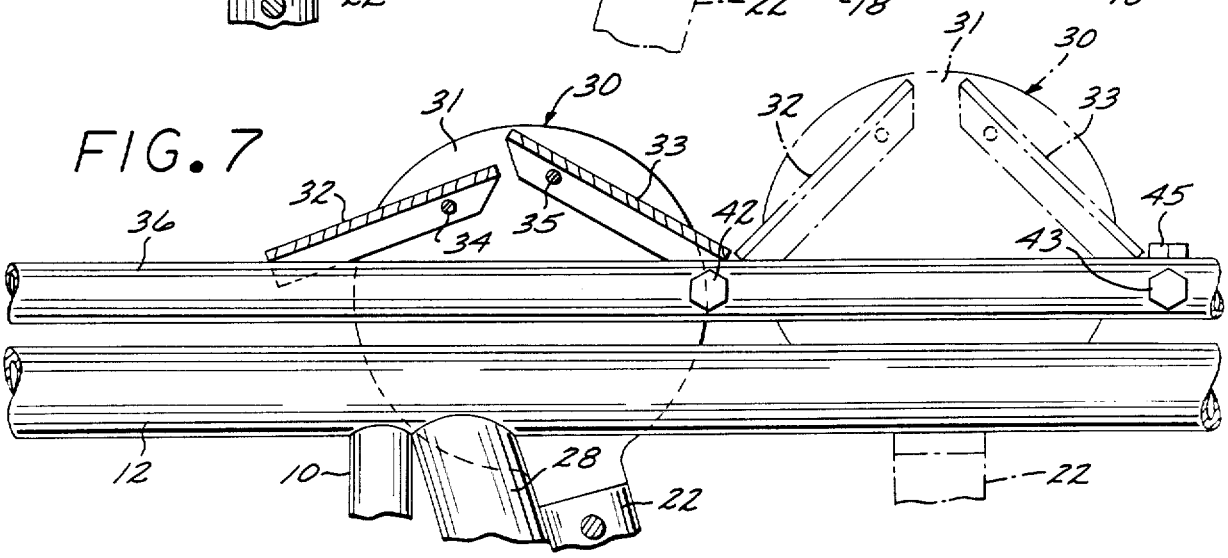
FIG. 7 is a view similar to FIG. 6, but illustrating the double couplers in their release positions, with the safety coupler in position to releasably prevent movement of the associated release stanchion to the position of FIG. 3.

Whether the cattle are locked in their feeding positions, by virtue of location of the latches 32 and 33 in the positions of FIG. 5, or whether the cattle are in their free feeding positions, in which the latches 32 and 33 are movable between the full line and phantom line positions illustrated in FIG. 7, it is possible for a cow to fall or becomes downed, jamming its head into the lower portion of the head opening 20. Removal of the cow's head from this narrow opening is not possible unless the release stanchion 20 can be pivoted clockwise to widen the space at the lower part of the head opening 20. In certain systems of the prior art, including a system disclosed in my U.S. Pat. No. 4,185,592, issued Jan. 29, 1980 for Cattle Stanchion Apparatus, the lower end of the release stanchions was normally held against movement to the position of FIG. 3 by engagement with a bracket on the bottom rail 14 which could be kicked out of the way by the dairyman. Moving the bracket released the stanchion so that it could be moved to the position of FIG. 3. However, reaching the bracket was awkward because of the presence of the downed cow. Further, once the bracket was reached and kicked out of the way the animal could slump farther down and sometimes trap or injure the dairyman's leg.

Figure 6:
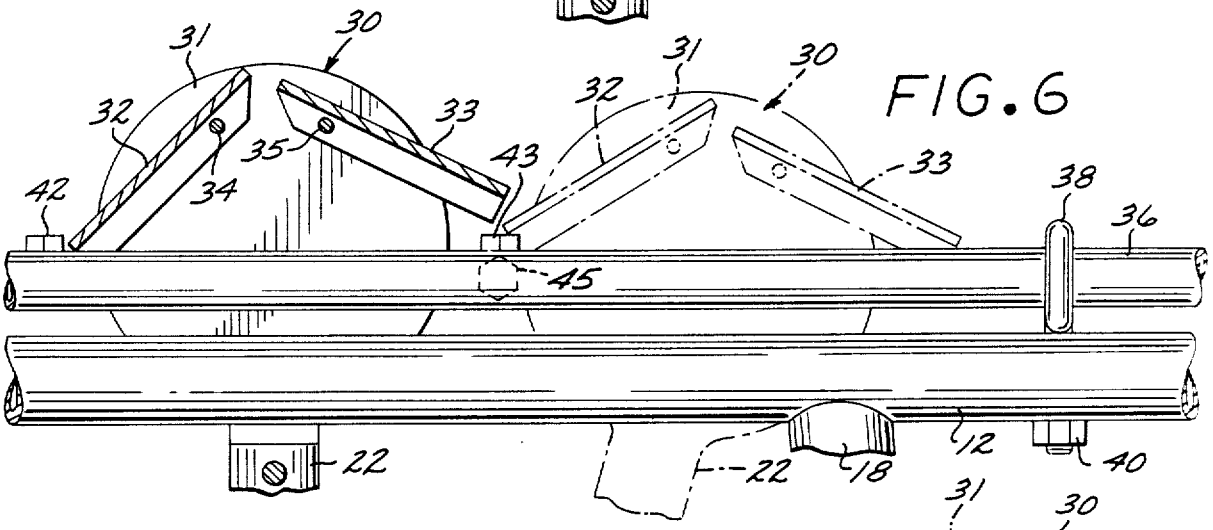
FIG. 6 is a view similar to FIG. 5, but illustrating manual raising and release of one of the latches to enable movement of the associated release stanchion to the position of FIG. 3.

With the arrangement of the preset invention, a dairyman can quickly free the release stanchion 22 for movement from the position of FIG. 1 to that of FIG. 3. He simply grasps the free end of the latch 33 and raises it so that it clears the coupler 43, as illustrated in FIG. 6, or so that it clears the coupler 45, depending upon whether the positioner 36 is is in the free feeding position of FIGS. 2 and 7 or the cattle retention position of FIGS. 4 and 5. This can be done without endangering the dairyman, and it is effective to quickly open a wide space at the bottom of the head opening 20 to facilitate extrication of a downed cow. Once the cow is extricated, the location of the latch 32 on top of the coupler 43 allows the release stanchion 22 to be simply pulled or kicked to the left or counter clockwise to locate it so that the latch 33 is to the left of the couplers 43 and 45.

Referring now to FIGS. 8–10, there is illustrated a second embodiment of the present invention which is substantially identical to the first embodiment in function and structure, except for the coupler arrangement and the size of the cooperating latches. Like numerals are employed to denote like parts in the two embodiments, with letter subscripts being used to denote parts having a slightly different structure, but essentially the same function. Thus, instead of using a second coupler 43 and safety coupler 45, as in the embodiments of FIGS. 1-7, a collar coupler 58 is used to provide the functions of those two parts.

Collar coupler 58 is cylindrical in form and is slidably fitted over an end of the tubular positioner 36, as best seen in FIG. 10. The collar coupler 58 is held, in the same longitudinal position as were the couplers 43 and 45 of the first embodiment, by a set screw 60 threaded through a suitable opening in the collar coupler and bearing against the adjacent surface of the positioner 36.

The collar coupler 58, like the first embodiment coupler 43, is adapted to engage a latch, in this case a wider latch 33a, to move the release stanchion 22 to an open position when the handle 52 is raised.

Should it be necessary when the stanchion 22 is in the closed position of FIGS. 1 and 5 to move the stanchion 22 to the downed cattle release position of FIG. 3, the dairyman can simply lift the latch 33a so that it will clear the collar coupler 58. In the downed cattle position the latch 32a will rest on top of the coupler collar 58, as seen in phantom outline in FIG. 11. After the downed cow is extricated, the channel legs of the wider latch 32a easily slide past the outer surfaces of the coupler collar 58 to allow the release stanchion to move back to the closed position of FIG. 5.

Since the collar coupler 58 projects outwardly of the positioner 36 throughout its circumference, the coupler 58 normally engages the latch 33a in the closed position of the stanchion 22 and prevents movement of the stanchion 22 to the downed cattle release position of FIG. 3, regardless of the rotated position of the positioner 36, that is, regardless of whether the positioner 36 is arranged to lock the cattle in, or is arranged to allow the cattle to freely enter and leave the feeding stall.

With reference to FIGS. 11 and 12, a third embodiment of the invention is illustrated which is substantially identical to the second embodiment. However, instead of using a coupler collar 58 affixed by a set screw 60 to the positioner 36, a coupler collar 58b is employed which encircles and axially slidably receives the positioner 36, but which is welded or otherwise affixed to the stationary top rail 12. With this arrangement the collar 58b is not operative to positively move the release stanchions 22 to their open positions. Instead, dependence is placed upon the weight of the release stanchions 22 to place them in their open positions. However, there are significant advantages in that the cost of a threaded collar 60 and set screw 58 is eliminated, as is the need for eyes 38 and nuts 40, inasmuch as the collar 58b axially slidably supports the positioner 36.

From the foregoing it will be apparent that cattle stanchion apparatus has been provided which is adapted to lock cattle in feeding stalls, or allow them to lock themselves in the stalls, or lock the cattle out of the stalls, or quickly enable release of a downed animal from its stall.

Various modifications and changes may be made with regard to the foregoing detailed description without departing from the spirit of the invention.

I claim:

1. In cattle stanchion apparatus including a fixed stanchion; a release stanchion located adjacent and spaced from said fixed stanchion to define a head opening for an animal; mounting means mounting said release stanchion for pivotal movement between an open position in which the upper part of said head opening is enlarged to enable an animal to place its head through said head opening, and a closed position in which said upper part of said opening is narrowed to hold the animal's head in said opening, said release stanchion being supported and arranged to fall into said open position; coupler mounting means, including fixed structure and a generally horizontally extending positioner longitudinally movable between extended and retracted positions, and pivotable about a longitudinal axis; rotating means operative to rotate said positioner about said longitudinal axis between a first position and a second position; and operator means operative to move said positioner between said extended and retracted positions, the improvement comprising:

coupler means including a first coupler portion mounted to said positioner and a second coupler portion mounted to said coupler mounting means in longitudinally spaced apart relation; and a pair of latches mounted to the upper extremity of said release stanchion and adapted for location between said first and second coupler portions, said pair of latches being engageable by both said first and second coupler portions in said first position of said positioner whereby longitudinal movement of said positioner between said retracted and extended positions moves said release stanchion between said closed and open positions, said pair of latches being out of engagement with said first coupler portion in said second position of said positioner whereby said release stanchion is freely movable between said open and closed positions, at least one of said latches being manually actuable to clear said second coupler portion and thereby enable pivotal movement of said release stanchion in a direction oppositely of said open position and past said closed position to a downed animal release position wherein the lower extremity of said release stanchion is spaced farther from said fixed stanchion to define a wider space at the bottom of said head opening.

2. The improvement according to claim 1 wherein said second coupler portion comprises a cylindrical collar affixed to said positioner and projecting substantially uniformly radially outwardly of said positioner.

3. The improvement according to claim 1 wherein said second coupler portion comprises a cylindrical collar affixed to said fixed structure of said cattle stanchion apparatus and longitudinally slidably receiving and supporting said positioner, said collar projecting substantially uniformly radially outwardly of said positioner.

4. The improvement according to claim 1 wherein said release stanchion is laterally offset toward said fixed stanchion adjacent the midportion of said release stanchion to promote movement of said release stanchion toward said open position.

5. The improvement according to claim 4 wherein said fixed stanchion is also laterally offset adjacent the midportion of said release stanchion to enlarge the midportion of said head opening.

6. The improvement according to claim 1 wherein said pair of latches are pivotally mounted to said release stanchion with their free extremities projecting on opposite sides of said release stanchion for engagement in said first position with said first and second coupler portions, respectively, whereby the release stanchion associated with said latches is prevented from moving from said closed position in one direction toward said open position, and in the opposite direction toward said downed animal release position, said positioner being rotatable by said rotating means to said second position to move said first coupler out of said path.

7. The improvement according to claim 6 wherein each of said latches is manually pivotable out of engagement with said first and second coupler portions.

8. The improvement according to claim 6 wherein said first and second coupler portions in said second position are located out of the path of possible engagement by said pair of latches, and said coupler means includes a third coupler portion mounted to said positioner and located in a path for engagement by one of said latches when said positioner is rotated to said second position whereby said release stanchion is movable toward said open position but is constrained by said third coupler portion against movement into said downed animal release position.

9. The improvement according to claim 8 wherein said one of said latches is manually pivotable out of engagement with said third coupler portion.

10. In cattle stanchion apparatus including fixed and release stanchions laterally spaced apart to define a head opening for an animal; a horizontally extending top rail above said release stanchion; mounting means mounting said release stanchion for pivotal movement between an open position in which the upper part of said head opening is enlarged to enable an animal to place its head through said opening, and a closed position in which said upper part of said head opening is narrowed to hold the animal's head in said opening; a generally horizontally extending positioner adjacent and parallel to said top rail, longitudinally movable between extended and retracted positions, and pivotable about a longitudinal axis; rotating means operative to rotate said positioner about said longitudinal axis between a first position and a second position; and operator means operative to move said positioner between said extended and retracted positions, the improvement comprising:

a first coupler carried by said positioner and projecting outwardly thereof;

an elongated latch having an inner extremity pivotally mounted to the upper extremity of said release stanchion, the outer extremity of said latch being slidable along said positioner in one direction to enable movement of said release stanchion from said closed position to said open position, said outer extremity of said latch being slidable along said positioner in the opposite direction for engagement with said first coupler in said first position to stop movement of said release stanchion in a direction away from said open position and past said closed position to a downed cattle release position wherein the lower extremity of said release stanchion is spaced farther from said fixed stanchion to define a wider space at the bottom of said head opening, said latch being manually actuable to disengage said first coupler.

11. The improvement according to claim 10 wherein said first coupler is in said first position is located for engagement with said latch, and in said second position is located out of possible engagement with said latch.

12. The improvement according to claim 11 including a second coupler secured to said positioner adjacent said first coupler and located in said second position for engagement with said latch to prevent movement of said release stanchion to said downed cattle release position.

13. The improvement according to claim 12 wherein said first and second couplers are bolt heads.

14. The improvement according to claim 12 wherein said first and second couplers are defined by a coupler collar disposed about and secured to said top rail for engagement with said latch in all rotated positions of said positioner.

15. The improvement according to claim 12 wherein said first and second couplers are defined by a coupler collar disposed about and secured to said positioner.

16. The improvement according to claim 15 wherein said coupler collar projects substantially uniformly outwardly of said positioner for engagement with said latch in all rotated positions of said positioner.

*17. In cattle stanchion apparatus including fixed and release stanchions laterally spaced apart to define a head opening for an animal; fixed structure including mounting means mounting said release stanchion for pivotal movement from an open position in which the upper part of said head opening is enlarged to enable an animal to place its head through said opening, to a closed position in which said upper part of said head opening is narrowed to hold the animal's head in said opening, and beyond said closed position to a downed cattle release position in which said upper part of said opening is further narrowed and wherein the lower part of said opening is enlarged to enable a downed animal to withdraw its head; and a generally horizontally extending positioner pivotable about a longitudinal axis between a first position and a second position; the improvement comprising:*

*coupler means carried by said positioner;*

*latch means carried by the upper extremity of said release stanchion and having a latch portion movable along said positioner in one direction to enable movement of said release stanchion from said open position to said closed position, said latch portion being movable along said positioner in the opposite direction for engagement with said coupler means in said first position of said positioner to stop movement of said release stanchion from said closed position to said open position; and*

*downed cattle latch and coupler means operative to engage said release stanchion in said closed position to prevent movement of said release stanchion to said downed cattle release position, said latch and coupler means being manually actuable to enable movement of said release stanchion to said downed cattle release position.*

*18. The improvement according to claim 17 wherein said latch portion includes an inner extremity pivotally mounted to said upper extremity of said release stanchion, and further includes an outer extremity movable along said positioner in said one direction to enable said movement of said release stanchion to said closed position, also movable along said positioner in said opposite direction for said engagement with said coupler means in said first position of said positioner to stop movement of said release stanchion to said open position, and also movable along said positioner in said opposite direction to clear and move past said coupler means in said second position to enable movement of said release stanchion to said open position.*

*19. In cattle stanchion apparatus including fixed and release stanchions laterally spaced apart to define a head opening for an animal; a horizontally extending top rail above said release stanchion; mounting means mounting said release stanchion for pivotal movement from an open position in which the upper part of said head opening is enlarged to enable an animal to place its head through said*

*opening, to a closed position in which said upper part of said head opening is narrowed to hold the animal's head in said opening, and beyond said closed position to a downed cattle release position in which said upper part of said opening is further narrowed and wherein the lower part of said opening is enlarged to enable a downed animal to withdraw its head; and a generally horizontally extending positioner adjacent to and parallel to said top rail, and pivotable about a longitudinal axis between a first position and a second position; the improvement comprising:*

*coupler means carried by said positioner;*

*latch means carried by the upper extremity of said release stanchion and having a latch portion movable along said positioner in one direction to enable movement of said release stanchion from said open position to said closed position, said latch portion being movable along said positioner in the opposite direction for engagement with said coupler means in said first position of said positioner to stop movement of said release stanchion from said closed position to said open position; and*

*downed cattle latch and coupler means having a portion secured to said top rail, said latch and coupler means being adapted to engage said release stanchion in said closed position to prevent movement of said release stanchion to said downed cattle release position, said latch and coupler means being manually actuable to enable movement of said release stanchion to said downed cattle release position.*

*20. In cattle stanchion apparatus including fixed and release stanchions laterally spaced apart to define a head opening for an animal; fixed structure including mounting means mounting said release stanchion for pivotal movement from an open position in which the upper part of said head opening is enlarged to enable an animal to place its head through said opening, to a closed position in which said upper part of said head opening is narrowed to hold the animal's head in said opening, and beyond said closed position to a downed cattle release position in which said upper part of said opening is further narrowed and wherein the lower part of said opening is enlarged to enable a downed animal to withdraw its head, said release stanchion being supported and arranged to fall into said open position upon any movement of said release stanchion from said closed position toward said open position; and a generally horizontally extending positioner pivotable about a longitudinal axis between a first position and a second position; the improvement comprising:*

*coupler means carried by said positioner;*

*latch means carried by the upper extremity of said release stanchion and having a latch portion freely movable along said positioner in one direction to enable movement of said release stanchion from said open position to said closed position, said latch portion being movable along said positioner in the opposied direction for engagement with said coupler means in said first position of said positioner to stop movement of said release stanchion from said closed position to said open position, said coupler means in said second position of said positioner being out of possible engagement with said latch portion whereby said release stanchion is freely movable to said open position; and*

*downed cattle latch and coupler means having a portion secured to said fixed structure, said latch and coupler means being adapted to engage said release stanchion in said closed position to prevent movement of said release stanchion to said downed cattle release position, said latch and coupler means being manually actuable to enable movement of said release stanchion to said downed cattle release position.*

*21. In cattle stanchion apparatus including fixed and release stanchions laterally spaced apart to define a head opening for an animal; fixed structure including mounting means mounting said release stanchion for pivotal movement from an open position in which the upper part of said head opening is enlarged to enable an animal to place its head through said opening, to a closed position in which said upper part of said head opening is narrowed to hold the animal's head in said opening, and beyond said closed position to a downed cattle release position in which said upper part of said opening is further narrowed and wherein the lower part of said opening is enlarged to enable a downed animal to withdraw its head, said release stanchion being supported and arranged to fall into said open position upon any movement of said release stanchion from said closed position toward said open position; and a generally horizontally extending positioner longitudinally movable between extended and retracted positions, and pivotable about a longitudinal axis between a first position and a second position; the improvement comprising:*

*coupler means carried by said positioner;*

*latch means carried by the upper extremity of said release stanchion and having a latch portion movable along said positioner in one direction to enable movement of said release stanchion from said open position to said closed position, said latch portion being movable along said positioner in the opposite direction for engagement with said coupler means in said first position of said positioner to stop movement of said release stanchion from said closed position to said open position, said latch portion upon engagement with said coupler means in said first position of said positioner being movable with said positioner during movement of said positioner toward said retracted position; and*

*downed cattle latch and coupler means having a portion secured to one of said positioner and said fixed structure, said latch and coupler means being adapted to engage said release stanchion in said closed position to prevent movement of said release stanchion to said downed cattle release position, said latch and coupler means being manually actuable to enable movement of said release stanchion to said downed cattle release position.*

* * * * *

US001032728A

REEXAMINATION CERTIFICATE (2033rd)

United States Patent [19]

[11] B1 Re. 32,728

Albers, Sr.

[45] Certificate Issued Jun. 8, 1993

[54] CATTLE STANCHION APPARATUS

[76] Inventor: Teo Albers, Sr., 18007 Arline Ave., Artesia, Calif. 90701

Reexamination Request:
No. 90/002,528, Nov. 29, 1991

Reexamination Certificate for:

| | |
|---|---|
| Patent No.: | Re. 32,728 |
| Issued: | Aug. 9, 1988 |
| Appl. No.: | 7,454 |
| Filed: | Jan. 27, 1987 |

Related U.S. Patent Documents

Reissue of:

| | | |
|---|---|---|
| [64] | Patent No.: | 4,495,897 |
| | Issued: | Jan. 29, 1985 |
| | Appl. No.: | 516,384 |
| | Filed: | Jul. 22, 1983 |

U.S. Applications:

[63] Continuation-in-part of Ser. No. 431,264, Sep. 30, 1982, Pat. No. 4,476,815.

[51] Int. Cl.[5] ..... A01K 1/06
[52] U.S. Cl. ..... 119/148
[58] Field of Search ..... 119/147.1, 148, 149

[56] References Cited

U.S. PATENT DOCUMENTS 4,185,592 12/1977 Albers, Sr. ..... 119/148

FOREIGN PATENT DOCUMENTS 2911431 9/1980 Fed. Rep. of Germany .
2242929 4/1975 France .

*Primary Examiner*—Robert P. Swiatek

[57] ABSTRACT

Cattle stanchion apparatus in which a plurality of fixed and release stanchions define a row of head openings for animals, the release stanchions tending to pivot to open positions. Double latches at the upper extremities of the release stanchions are engageable by couplers carried by a rotatable and axially movable positioner. An operating mechanism is actuable to axially move the positioner and engage the latches of the release stanchions to move them in unison, and an associated rotating mechanism is actuable to rotate the positioner and thereby move the couplers into and out of possible engagement with the latches. The arrangement gives the operator the capability of moving all of the release stanchions to closed positions to lock the animals in the feeding stalls, or allowing the animals individually to actuate the system to lock themselves in, or allowing the animals to enter and leave the stalls as they wish. The latches are manually manipulatable to quickly and safely release downed cattle from individual feeding stalls.

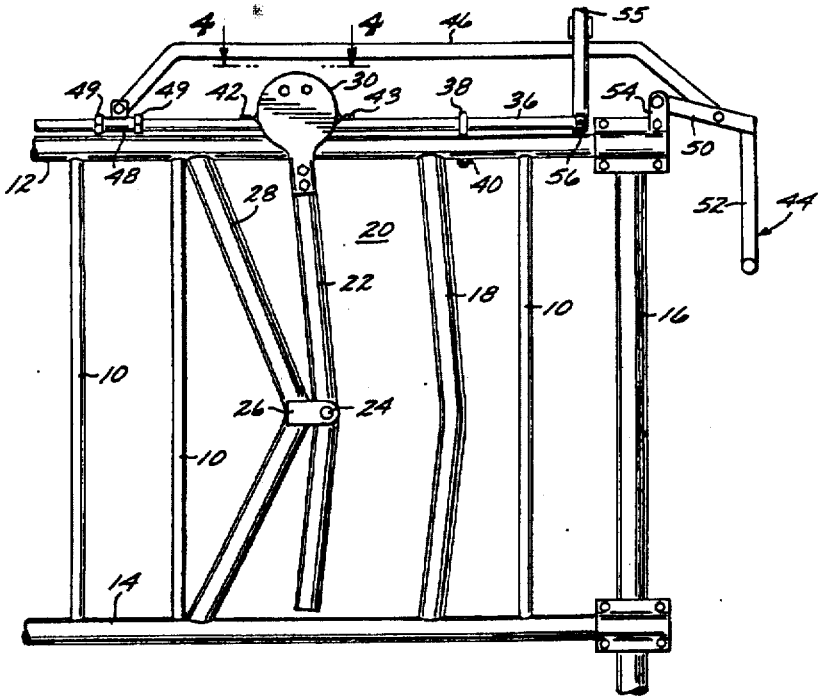

REEXAMINATION CERTIFICATE ISSUED UNDER 35 U.S.C. 307

THE PATENT IS HEREBY AMENDED AS INDICATED BELOW.

AS A RESULT OF REEXAMINATION IT HAS BEEN DETERMINED THAT:

The patentablity of claims 1-16 and 19 is confirmed.

Claims 17, 18, 20 and 21 are cancelled.

* * * * *